May 2, 1961 J. O. EAMES 2,982,377
LIQUID COOLED FRICTIONAL MECHANISM
Filed Dec. 30, 1957 4 Sheets-Sheet 1

INVENTOR
JAMES O. EAMES
BY Scrivener & Parker
ATTORNEY

May 2, 1961  J. O. EAMES  2,982,377
LIQUID COOLED FRICTIONAL MECHANISM
Filed Dec. 30, 1957  4 Sheets-Sheet 2

INVENTOR
JAMES O. EAMES

BY Scrivener & Parker

ATTORNEY

May 2, 1961  J. O. EAMES  2,982,377
LIQUID COOLED FRICTIONAL MECHANISM
Filed Dec. 30, 1957  4 Sheets-Sheet 4
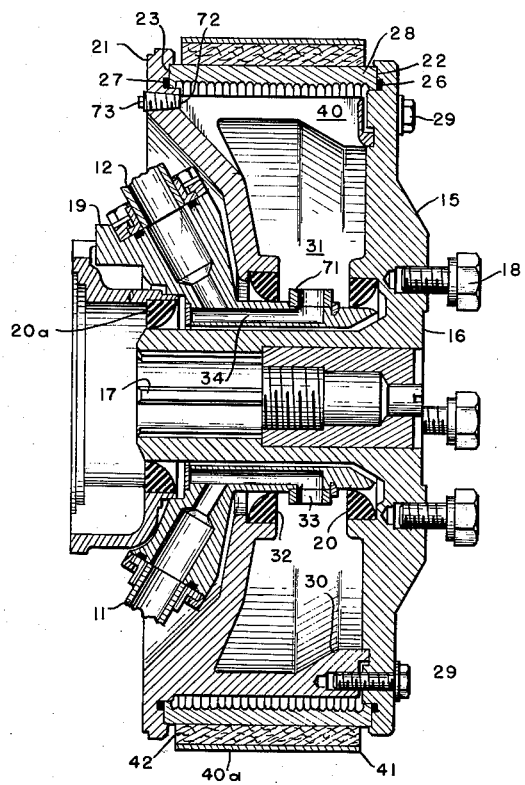
FIG. 8
FIG. 9
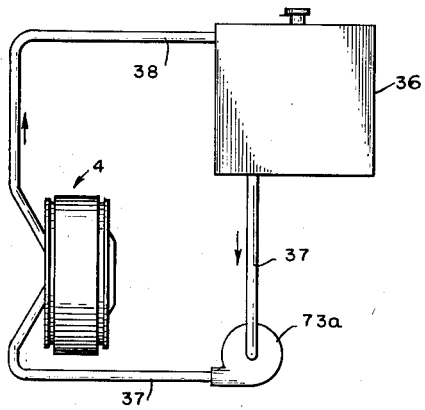
INVENTOR
JAMES O. EAMES
BY *Scrivener & Parker*
ATTORNEY United States Patent Office 2,982,377
Patented May 2, 1961

2,982,377

LIQUID COOLED FRICTIONAL MECHANISM

James O. Eames, Washington, Conn., assignor to Roy S. Sanford, Woodbury, Roger H. Casler and James O. Eames, Washington, and Wilfred A. Eaton and Erling D. Sedergren, Woodbury, Conn.

Filed Dec. 30, 1957, Ser. No. 706,033

13 Claims. (Cl. 188—264)

This invention relates to frictional mechanism, hereinafter generally referred to as brake mechanisms, and more particularly to brake and clutch mechanisms of the liquid cooled type.

The excessive heat developed during the operation of such mechanisms has caused difficulties in the past, and it is accordingly one of the objects of the invention to provide means for overcoming these difficulties.

Another object is the provision of novel brake cooling means.

Yet another object of the invention is the provision of novel frictional mechanism adapted for cooling by means of a circulating liquid.

Still another object is the provision of brake mechanism of the liquid cooled type, so constituted that the brake mechanism itself serves to circulate the cooling liquid.

Yet another object is the provision of a novel brake drum construction particularly adapted for cooling by means of a circulating liquid.

A further object of the invention is to provide, in brake mechanism of the above type, novel and efficient means for circulating a cooling liquid in the brake mechanism to cool the brake.

A still further object of the invention is to provide novel liquid cooled brake mechanism for a vehicle, wherein a portion of the vehicle engine cooling system is utilized for the purpose of cooling the brake mechanism.

Yet another object of the invention is to provide a liquid cooled brake mechanism so constituted as to conduct heat away from the friction surfaces of the brake in a novel and efficient manner.

These and other objects of the invention will be more readily apparent from the following detailed description, when taken in connection with the accompanying drawings. It is to be expressly understood, however, that the description and drawings are not to be taken as defining the limits of the invention, reference being had for this purpose to the appended claims.

In the drawings, wherein similar reference numerals refer to similar parts throughout the several views, Fig. 1 is a side elevational view in section of a brake mechanism embodying the principles of the present invention;

Fig. 8 is a side elevational view in section showing a modification of the brake mechanism of Fig. 1, and Fig. 9 is a diagrammatic view of a liquid circulating system for the brake mechanism of Fig. 8.

Figure 4:
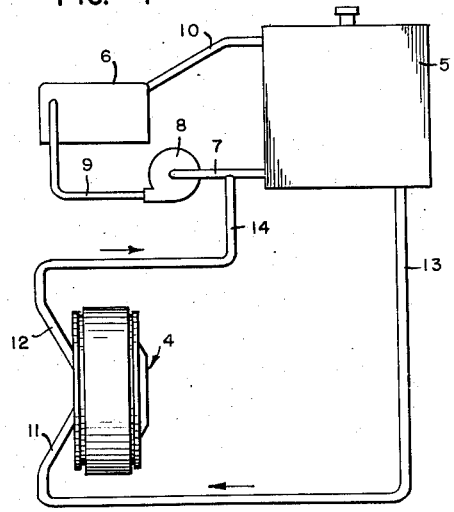
Fig. 4 is a diagrammatic view of a liquid circulating system for the brake.

Referring first to Fig. 4 on the drawings, the system as shown includes in general, a brake mechanism 4, adapted in the present instance to be mounted as a driveshaft brake on the vehicle, and an engine radiator or heat exchanger 5 having the lower end connected to the water jacket of an engine 6 through a conduit 7, a pump 8, and a conduit 9, and having its upper end connected to the upper end of the engine water jacket by means of a conduit 10. As will be hereinafter described, the brake mechanism 4 is proviedd with an inlet connection 11, and an outlet connection 12, the connection 11 being connected to the lower end of the radiator 5 by means of a conduit 13, and the outlet connection of the brake mechanism being connected by a conduit 14 to the lower end of the radiator adjacent the conduit 7 which goes to the suction of the pump 8. It will be understood from the foregoing that the conduit 14 may be connected directly to the lower end of the radiator adjacent the connection of conduit 7 thereto, or may be connected to the conduit 7 as indicated on the drawing.

Figure 1:
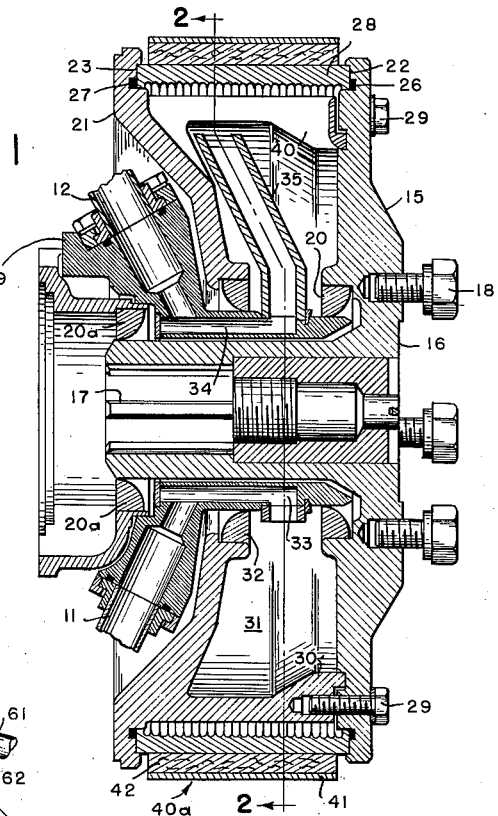

Referring first to Fig. 1, the brake mechanism includes a cylindrical drum carrying member 15 having a hub portion 16 adapted to be mounted on the driveshaft of the vehicle and secured thereto for rotation therewith by means of splines 17, the driveshaft not being shown in the drawing. The right end of the member is provided with cap screws or bolts 18 adapted to secure one portion of a driveshaft universal joint to the right face of the member 15 in a conventional manner. A packing gland member or stationary member 19 is mounted on the outside of the hub 16 in such a manner that the hub can rotate therein with the driveshaft without rotating the packing gland member, and the packing gland member is held against rotation with the drum member 15 by means not shown, connecting the gland member to the vehicle frame. A rotary seal and bearing 20 is associated with the gland member and the hub 16 in order to prevent the leakage of liquid from the brake mechanism to atmosphere. A bearing 20a supports the left end of the hub for rotation in the gland member.

A second cylindrical drum carrying member 21 is provided mounted on the gland and spaced from member 15 as shown, and concentric grooves 22 and 23 are provided adjacent the outer peripheries on the drum members 15 and 21, and sealing rings of the O ring type 26 and 27 are provided as indicated. A cylindrical metal friction element or drum 28, preferably formed of high thermal conductivity metal, as defined hereinafter, is so constructed as to fit into the grooves 22 and 23, and this ring is clamped between the drum members 15 and 21 by means of cap screws 29 which engage bosses 30 on the member 21 at their left ends and draw the two drum members together with the cylindrical friction element 28 clamped therebetween. The O rings 26 and 27 serve to prevent leakage of liquid between the drum members and the friction element, and the clamping action serves to transmit the torque exerted on the cylindrical friction element 28 to the drum member 15. If necessary, although not shown in the drawing, the end faces of the cylindrical friction element and the bottoms of the grooves 22 and 23 may be serrated in order to provide a positive drive between the cylindrical friction element and the drum members, or dowels may be provided. Although the element 28 has been referred to as a brake drum, it will be understood that the assembly of the drum and drum members 15 and 21 may also be considered as a brake drum.

With the drum members and the friction element assembled as above described, it will be understood that a relatively large annular cooling liquid chamber 31 is formed by the members 15, 21, the friction element 28, and the packing gland member 19, the escape of liquid from this chamber to atmosphere between the inner periphery of the drum member 21 and the outer periphery of the packing gland member 19 being prevented by means of a suitable rotary seal and bearing 32. The packing gland is provided with an inlet passage or connection 33, this passage extending from the exterior of the packing gland to the interior of the chamber 31 as shown. In like manner, an outlet passage 34 extends through the packing gland from the exterior thereof to the interior of the chamber 31, the inner end of the passage being connected to the chamber through a connecting conduit or extension 35 which is secured to the stationary packing gland 19, and extends radially outward to a point adjacent the outer periphery of the chamber. It will be noted that the inner end of the passage 33 connects with the chamber in a region closely adjacent to the axis of rotation of the drum members, while the outlet passage 34 through the extension 35 connects with the chamber 31 closely adjacent the outer portion of the chamber in a region spaced radially outward from the point of connection of the passage 33 with the chamber. Consequently, assuming that the chamber is filled with a suitable cooling liquid, and that the drum members and the friction element 28 are rotating with the vehicle driveshaft, it will be understood that due to the action of centrifugal force, the cooling liquid tends to be thrown outward to the outer portion of the chamber, creating a pressure in that portion which is appreciably greater than the pressure adjacent the point of connection on the inlet passage 33 with the chamber. Since the extension 35 and the packing gland to which it is connected are stationary and do not rotate with the drum, there is no centrifugal force acting on the liquid in the extension 35, and consequently, due to the pressure differential between the inner portion of the chamber adjacent the inner end of the passage 33 and the outer portion of the chamber adjacent the connection of the extension 35 therewith, on rotation of the drum members and friction element, liquid tends to be drawn into the chamber through the passage 33, and to be pumped out of the chamber through the extension 35 and the passage 34, thus providing a self-pumping action whenever the drum members are rotating with the vehicle shaft.

In order that this pumping action may be utilized to provide a circulation of the liquid in the drum and cool it at a location outside the drum, it will be noted in Fig. 4, that the outlet passage 34 is connected to the lower portion of the radiator through the conduit 14 as heretofore described, while the inlet passage 11 is connected to the radiator at another point through the conduit 13. Consequently liquid is supplied from the radiator to the drum chamber 31 through the conduit 13 and the passage 11 and is pumped from the chamber back to the radiator at another point through the passage 34 and the conduit 14 and/or conduits 7 and 14 as the case may be, to another portion of the radiator.

Figure 5:
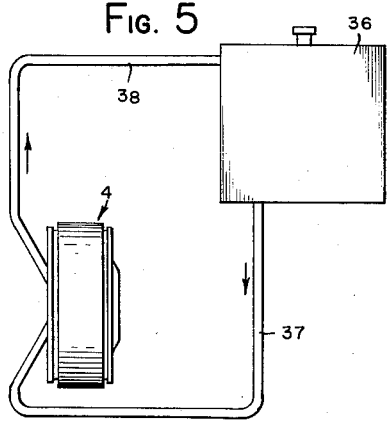
Fig. 5 is a diagrammatic view of a modified form of liquid circulating system.

Referring now to Fig. 5 of the drawing, this shows diagrammatically an arrangement wherein a heat exchanger 36 separate from the engine radiator is mounted on the vehicle adjacent the brake mechanism 4, and has its lower portion connected to the inlet passage 33 of the brake packing gland member by a conduit 37, and its upper portion connected to the outlet passage 34 of the packing gland member by means of a conduit 38. With this arrangement, it will be understood that the brake cooling system is entirely independent of the vehicle cooling system for the engine, and that by mounting the heat exchanger 36 adjacent the brake mechanism, the use of long conduits or hoses leading to the engine cooling system may be eliminated.

Figure 6:
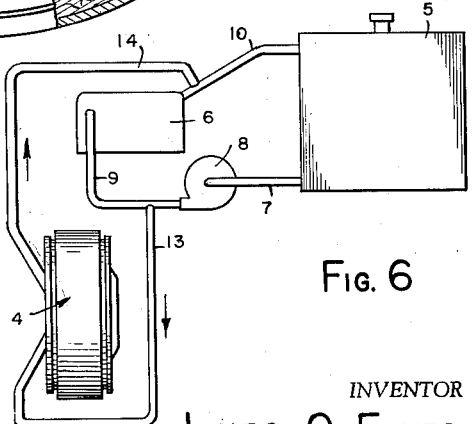
Fig. 6 is a diagrammatic view of another modified form of liquid circulating system.

If it is desired to utilize the engine cooling system and at the same time increase the degree of cooling liquid circulation through the brake mechanism, the latter mechanism may be connected to the cooling circuit in the manner shown in Fig. 6 of the drawings. In this case, the inlet passage of the brake mechanism is connected to conduit 9 adjacent the outlet of the pump by means of conduit 13, while the outlet passage in the brake is connected to the engine cooling system adjacent the upper portion thereof by conduit 14, as for example, to the upper end of the water jacket or the upper end of the radiator, or to the conduit 10 as shown in the drawing. With this type of connection, and disregarding for the moment the inherent pumping action of the brake mechanism itself, it will be understood that a pressure differential exists between the point of connection of the conduit 13 with the conduit 9 and the point of connection with the conduit 14 with the conduit 10, and that the pressure is less at the latter point. Consequently the engine pump 8 is effective to pump a portion of the liquid taken from the bottom of the radiator through conduit 7, through the cooling chamber of the brake mechanism and back to the upper portion of the vehicle radiator as previously described, this liquid being shunted across the water jacket of the vehicle engine.

Thus, the vehicle engine pump 8 acts as a booster pump to supercharge the centrifugal pump which forms a portion of the brake mechanism 4, resulting in an appreciable increase in flow of the cooling liquid through the brake mechanism.

Figure 2:
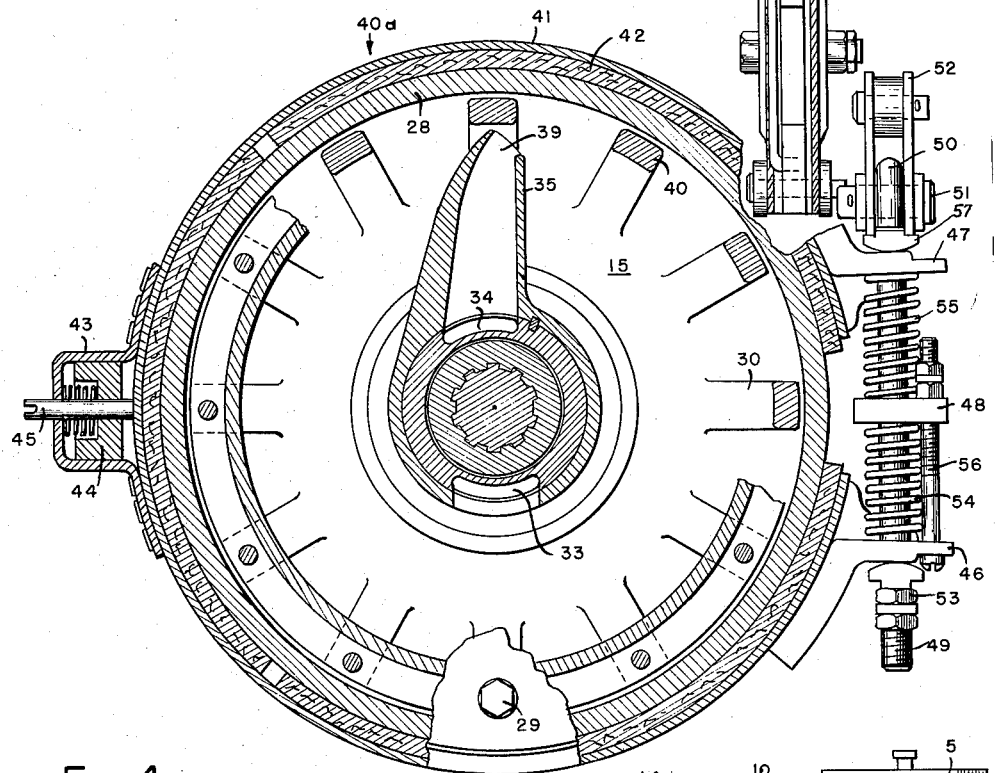
Fig. 2 is a sectional view of the mechanism shown in Fig. 1 taken along line 2—2 of that figure.

Referring now to Fig. 2 of the drawings, it will be noted that the extension 35 of packing gland member 19 is provided with a scoop shaped outlet 39, and assuming that the cylindrical friction element 28, as shown in this view, normally rotates in a counterclockwise direction when the vehicle is going ahead, it will be understood that in addition to the pumping action effected by centrifugal force, as heretofore described, this scoop, the open end of which faces in a direction opposite to the direction of rotation of the drum, will also tend to retard the rotation of the cooling liquid with the drum and force it through the scoop and into the extension 35 and the outlet passage 34, the bosses 30 and fins 40, which form an integral part of the drum, serving to enhance this pumping action in view of the fact that they tend to cause the cooling liquid in the outer portion of the chamber 31 to rotate with the drum. The outer surfaces of fins 40 are, however, spaced inwardly from the inner surface of the drum 28.

Figure 3:
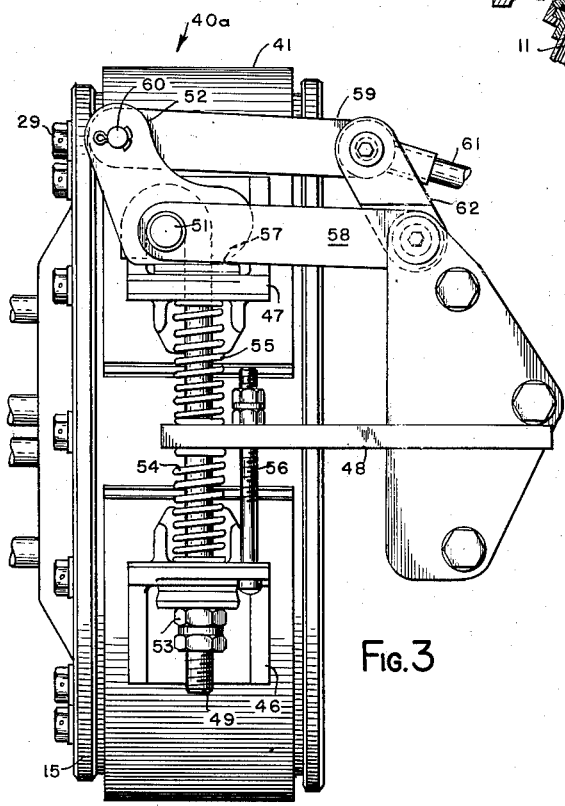
Fig. 3 is a view of an actuating mechanism for the brake.

In the embodiment shown, the outer surface of the friction element 28 is surrounded by a contracting brake shoe 40a which comprises a flexible brake band 41 having a relatively nonheat-conductive facing or composition lining 42 secured to the inner surface thereof in the conventional manner. A lug 43 secured to the band 41 is mounted on an anchor 44 secured to the vehicle, the lug being provided with an adjusting screw 45 for adjusting the shoe clearance. The free ends of the shoe are provided with suitable lugs 46 and 47, and as shown in more detail in Fig. 3, actuating means is provided for engaging these lugs in order to contract the brake band to effect frictional engagement between the composition lining or facing 42 and the outer surface of the cylindrical friction element 28. Such mechanism includes an anchor member 48 secured to the frame of the vehicle and extending between the lugs 46 and 47. An actuating bolt or rod 49 extends through the anchor and through suitable bores in the lugs 46 and 47, the upper end of the bolt being connected by means of a hook portion 50 to a pin 51 passing through an actuating cam 52, and the lower end of the bolt being provided with a nut 53 adapted to engage the underside of the lug 46. Springs 54 and 55 are interposed between the lower and upper sides respectively of the anchor 48 and the inner sides of the lug 46 and 47 in order to ordinarily force the lugs and the free ends of the brake band apart to prevent dragging of the friction lining on the rotatable friction element. In addition, an adjustable rod 56, serves to adjust the position of the brake band relative to the rotating friction element. The cam 52 is provided with a cam portion 57 adapted to bear against the upper side of the lug 47, and on rotation of the cam in a clockwise direction about the pin 51, the rod 49 is pulled upward and at the same time the lug 47 is forced downward, thus contracting the brake band to effect frictional engagement of the lining 42 with the outer surface of the friction element 28. The actuating mechanism is conventional, and includes a link 58 connected to the pin 51 at one end and to a portion of the anchor 48 at the other end to space the pin 51 and consequently the brake band itself from the anchor, together with a second link 59 connected to the upper end of the cam 52 by means of a pin 60, and connected at its right end to a brake rod 61 adapted to be operated by a control lever in the usual manner. It will also be noted, that the link 59 is spaced from the link 58 by means of a link 62, this arrangement, together with the arrangement of the anchor 43 and its adjusting screw 45, insuring that the brake band will be properly positioned with respect to the rotating portion of the brake at all times. It will be understood that the actuating mechanism is conventional, and that it forms no part of the present invention.

It will be readily apparent from the foregoing description, that novel and efficient liquid cooled brake mechanism has been provided, wherein parts of the brake mechanism provide a self-contained liquid pump which insures circulation of the cooling liquid in the brake drum and through a suitable heat exchanger connected thereto as heretofore described. It should also be noted that during a braking operation, the drum is decelerated, and consequently the liquid in the drum, due to its inertia, tends to flow along the inner surface of the cylindrical friction element 28 to further improve the cooling action and to insure the efficient transfer of heat from the friction element 28 to the cooling liquid, this being permitted by the spacing between the outer surfaces of fins 40 inwardly from the inner surface of friction element 28. Thus, we have in effect a double pumping action, including that just described, and that effected by the centrifugal pumping action of the brake mechanism.

It will be further understood that this arrangement can be readily connected to the vehicle engine cooling circuit if desired, or that a separate heat exchanger can be connected to the cooling chamber of the brake through the passages in the packing gland, the heat exchanger being mounted directly adjacent the brake mechanism on the vehicle chassis in order to eliminate the long pipe lines and hose lines which might otherwise be required.

Figure 7:
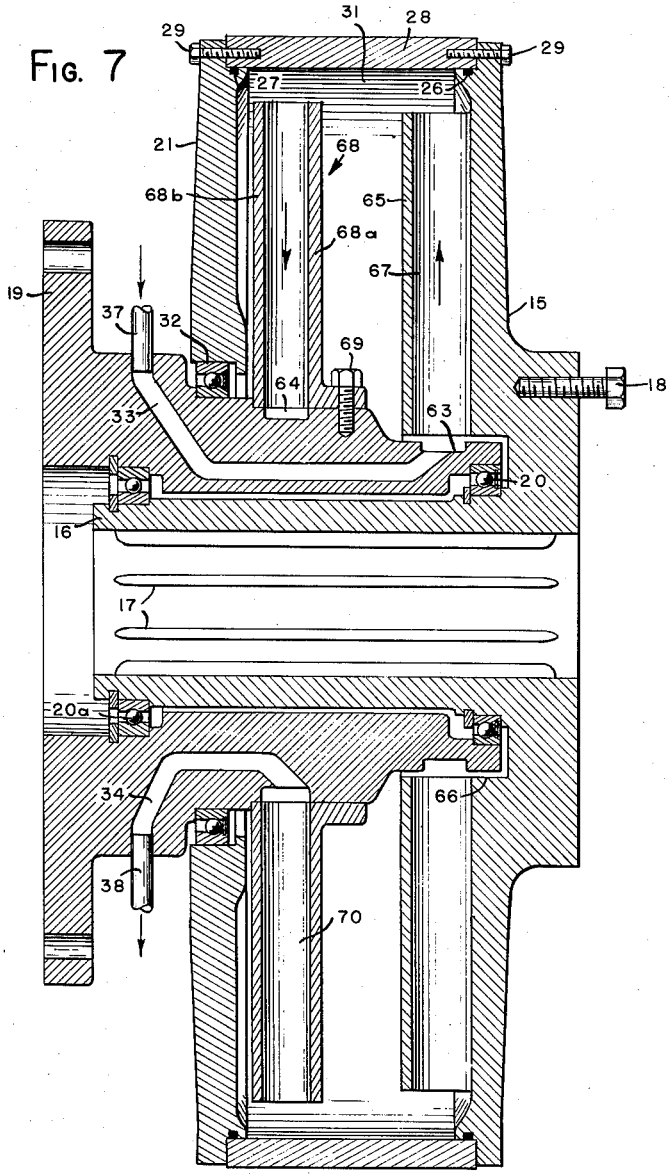
Fig. 7 is a side elevational view in section of a modified form of brake mechanism.

A modified form of liquid cooled brake mechanism is shown in Fig. 7, and includes a drum carrying member 15 having a hub portion 16 adapted to be mounted on the drive shaft of a vehicle for rotation therewith, the right end of the hub being provided with screws or bolts 18 for the attachment to one portion of a vehicle universal joint, not shown. A packing gland member 19 is mounted on the hub in such a manner that the drum member and hub portion can rotate about the packing gland member. A combined bearing and rotary seal 20 permits such rotation and prevents leakage and a bearing 20a is provided at the left end of the hub.

A second drum carrying member 21 is provided as shown, and a cylindrical metal friction element 28, preferably formed of a high thermal conductivity metal as hereinafter defined, and adapted to be engaged by a brake shoe having a facing of relatively non-heat conductive material, not shown, is secured to the drum members by cap screws 29. Sealing rings 26 and 27 serve to prevent leakage between the friction element and the drum members. With the drum members and friction element assembled as described, it will be understood that a relatively large annular cooling liquid chamber 31 is formed by the drum members, metal friction element and packing gland member, the escape of liquid from this chamber between the drum member 21 and the periphery of the packing gland member being prevented by a combined bearing and rotary liquid seal 32. Thus the assembly comprising the spaced apart drum members 15 and 21 and the metal friction element 28 is supported for rotation on gland member 19 by combined bearings and seals 20 and 32 and by bearing 20a. It should also be noted that the bearing and seal 32 can "float" axially with respect to member 19 and drum member 21, thus permitting the latter to move slightly axially relative to drum member 15 in response to axial thermal expansion and contraction of friction element 28, and preventing distortion of these parts.

The packing gland member 19 is provided with an inlet passage 33, extending from the outside of the member and terminating in an annular inlet groove 63 formed on the outer surface of the packing gland member. An outlet passage 34 extends through the gland member from the outside thereof and terminates in an annular outlet groove 64 formed on the outer surface of the gland member. The left face of member 15 is provided with an impeller portion 65 extending into chamber 31, and having a central bore 66 so dimensioned as to permit rotation about gland member 19 with a slight clearance. A plurality of channels or passages 67 are provided, these registering at their inner ends with the groove 63 and extending radially outward and connected at their outer ends with chamber 31 in a region closely adjacent inner surface of element 28 and in a region, closely adjacent the right end thereof. The packing gland member is provided with an outlet member or extension 68 mounted thereon in sealing engagement and secured thereto as by a cap screw 69. This member is provided with radial passages 70, connected at their outer ends with chamber 31 in a region closely adjacent the inner surface of element 28 and closely adjacent the left end thereof, and registering at their inner ends with outlet groove 64.

The extension 68 is preferably cylindrical, and radial surfaces 68a and 68b are smooth and corresponding to surfaces generated by two axially spaced radially extending lines revolving about the axis of rotation of drum carrying members 15 and 21. Thus the extension imposes very little restriction to the rotation of the liquid in chamber 31 with the drum assembly, thus substantially eliminating any unnecessary power loss due to fluid friction. Since the packing gland member is stationary, the outlet member is also stationary, while impeller portion 65 rotates with drum members 15 and 21 and friction element 28. The inlet and outlet passages 33 and 34 are connected with a suitable heat exchanger as shown in Figs. 4–6, or in any other suitable manner. The passage arrangement above described insures the circulation of cooling liquid axially across the entire inner surface of element 28.

Assuming that the brake is connected to the heat exchanger as shown in Fig. 5, and that the system is filled with a suitable cooling liquid, it will be apparent that on rotation of the drum members and friction element about the packing gland member, the impeller portion 65 will act as a centrifugal pump, drawing cooling liquid in through passage 33 and groove 63 and discharging it into chamber 31 in a region adjacent the right end of friction element 28. The liquid will flow to the left across the inner surface of friction element 28, and be discharged from the chamber through passages 70, groove 64 and and outlet passage 34. Since the outlet member 68 is stationary, the liquid in passages 70 thereof is not subjected to centrifugal force, and consequently the liquid adjacent the inner surface of the friction element can be readily discharged as described, since it is pressurized by the action of the impeller and centrifugal force. From the foregoing, it will be evident that the construction described insures a very efficient pumping action, resulting in circulation of the cooling liquid without the use of pumping means other than that which is included in the brake mechanism.

For the purposes of this description, and referring particularly to Figs. 1 and 7, it is assumed that the left side of the brake faces toward the front of the vehicle. In the event the chamber 31 is not completely filled with liquid, and the forward motion of the vehicle is suddenly retarded, the liquid will tend to be thrown to the left end of the cooling chamber. In order to insure the continued circulation of liquid under these conditions, the outer end of extensions 35 in Fig. 1, and the outer ends of passages 70 in Fig. 7, are so positioned as to connect with chamber 31 in the region adjacent the left side thereof, and since, during sudden retardation of the vehicle, the liquid tends to be thrown into this region, the outer ends of extension 35 and passages 70 respectively are always submerged in the liquid and the flow of liquid is not interrupted.

It is also pointed out that in order to insure that the annular liquid chamber can be substantially filled with cooling liquid, the extension 35 of Fig. 1 preferably extends upward in the chamber so as to connect the outlet passage to the chamber at substantially the uppermost region thereof, so that when the system is being filled with liquid, air or vapor in the upper region of the chamber can be expelled through the outlet passage. In like manner in the structure of Fig. 7, one of the passages 70 preferably terminates in the chamber in substantially the uppermost region of the chamber for the same reason. In this manner means are provided for venting the uppermost portion of the chamber through the heat exchanger.

In addition to the liquid circulation which occurs due to the pumping action of the brake, there is a natural or thermosyphon circulation which occurs in the region adjacent the inner surface of the metal friction element 28. As the liquid at the surface of the element is heated, it "rises" toward the center of chamber 31, or toward a region of lower pressure, and cooler and heavier liquid from a region near the center of the drum is thrown outward by centrifugal force to replace the heated liquid. Consequently, a localized thermo-syphon circulation takes place continuously in the region adjacent the inner surface of the friction element when the drum is rotating and the brake is applied.

In some cases it may be desirable to utilize an external pump, driven by the vehicle engine or by other suitable means, as the sole medium for effecting the forced circulation of cooling liquid through the brake mechanism, and such a modification is shown in Figs. 8 and 9. Referring first to Fig. 8, the construction may be identical with that shown in Fig. 1, except that a short outlet extension 71 on the packing gland replaces the extension 35 and the scoop 39, the open end of outlet extension 71 being spaced radially outward from the axis by substantially the same distance as the open end of inlet passage 33 of Fig. 1. Consequently there is no pressure differential between these inlet and outlet openings, and therefore no pumping action. In addition, a vent port 72 is provided as shown adapted to be closed by a plug 73, so positioned that when the mechanism is rotated to position the port at the highest point, the plug may be removed while the system is initially being filled with cooling liquid, and will serve to vent substantially all the air from the annular chamber 31 and allow it to be filled with liquid, since the extension 35 is no longer available for this purpose. It is to be understood that such a vent plug can also be incorporated in the structures of Figs. 1 and 7 if desired.

As shown in Fig. 9, similar to Fig. 5, the inlet of the brake is connected to a heat exchanger 38 by a conduit 37, and the outlet is connected to the upper portion of the heat exchanger by conduit 38. A pump 73a, driven by any suitable means, is connected in series in conduit 37; the suction of the pump being connected to the bottom of the heat exchanger and the outlet being connected to the inlet of the brake mechanism.

With this arrangement, cooled liquid enters the annular chamber near the axis through inlet 33, and is thrown outward by centrifugal force toward the inner surface of the metal friction element. As this liquid is heated by the metal element during a brake application, it becomes lighter, and is therefore forced inwardly by the entering cooler liquid, and returns to the heat exchanger through outlet 71 and conduit 38. In the event the pump 73 is omitted from the circuit a thermo-syphon circulation occurs in the direction above described, the cooler entering liquid being forced outward in chamber 31, and displacing the hotter and lighter liquid adjacent the inner surface of metal friction element 28. In the event the pump is utilized, this thermo-syphon action assists the pump in circulating the cooling liquid.

It should be understood that the brake mechanisms shown in Figs. 1 and 7 may be used in any of the circulating systems shown in Figs. 4, 5, 6 and 9, and that the mechanism of Fig. 8 may be connected in these systems in the event the self-contained pumping action is not considered necessary. In addition, other modifications may be made, such as the substitution in Fig. 7 of the scoop and extension 35 of Fig. 1 in place of the extension 68 of Fig. 7, or the substitution of the extension 68 of Fig. 7 for the extension 35 in Fig. 1.

It is also pointed out that the mechanism of the invention is primarily a friction brake mechanism, as the term is commonly used, as distinguished from fluid friction brake mechanisms. It is true that power is used in circulating the liquid, but aside from this, substantially the only parts of the mechanism causing turbulence of the liquid in the annular chamber and consequent power consuming friction are the extensions 35 and 68 in Figs. 1 and 7 respectively. On Fig. 7, for example, due to the formation of the extension 68, the fluid friction is negligible except for that which is due to the pumping. In other words, if the chamber were filled with liquid and the passages 33 and 34 of Fig. 7 closed, there would be substantially no resistance to rotation of the drum assembly. This is an important feature, since any power loss due to fluid friction is undesirable.

The brake illustrated and described is particularly adapted for use as a driveshaft brake on vehicles, it being well known that brakes of this type on many of the present vehicles are inadequate for safe braking, and that they are used primarily as parking brakes. In a vehicle equipped with the conventional four wheel brakes, a brake of this type provides a very efficient retarder or emergency brake, as well as a parking brake, and the ability of the brake to dissipate heat to the cooling liquid is such that the brake may well be used for stopping the vehicle in the same manner as the conventional four wheel brakes if desired. Thus an additional safety factor is provided for vehicles of this type and particularly for trucks and busses.

Although the description has referred to the above mechanism as a brake, it is to be understood that the term brake is intended to include clutches, as it will be readily apparent that the principles of the invention described are readily applicable to any situation wherein we have a pair of relatively rotatable parts which are adapted to be frictionally engaged. In other words, the brake band or shoe may be attached to one of the rotating portions and the cylindrical friction element may rotate with the other portion, the packing gland and its passages being stationary as described in order to provide the pumping action set forth. Thus it is contemplated that a device of this type may be adaptable to punch presses and other industrial machinery wherein sudden stops or many clutching actions are required.

It has been found in connection with brakes of this type that high thermal conductivity metals having good friction characteristics and utilized with relatively non-heat-conductive composition brake linings give extremely efficient operation. Although other metals may be utilized in certain installations requiring very low energy absorption, the above refered to high thermal conductivity metals are considered essential when relatively high energy absorption is required. As utilized in this application, the term "high thermal conductivity metals" means metals such as copper, silver, and some of the alloys thereof, wherein the melting point of the metal is at least 1500° F. and the thermal conductivity is at least 40% that of pure electrolytic copper. Commercially available pure bus bar or electrolytic copper has been found to be extremely efficient when utilized with a relatively non-heat-conductive composition brake lining.

In the present invention, a novel brake drum construction is provided, so constituted as to permit the use of friction elements of the above metals, it being noted that the rotating brake drum carrying members may be made of cast iron or other relatively low cost materials, while the rotating friction element may be made of the more expensive copper or other high thermal conductivity metal. Other drum constructions may be utilized, however, without departing from the spirit of the invention.

Although the mechanism has been shown as applied to a brake of the so-called drum type utilizing cylindrical drums, it is also to be understood that the term "drum type" is intended to include brakes untilizing drums or rotating friction members having other configurations. It will be well understood by those skilled in the art that such constructions may be utilized without departing in any way from the spirit of the invention.

Commercially available grades of copper are listed in the pamphlet Commercially Important Wrought Copper Alloys, Copyright 1948, Chase Brass and Copper Co., Waterbury, Conn., page 22, and in the pamphlet Revere Copper and Copper Alloys, Copyright 1949, Revere Copper and Brass Inc., New York, N.Y., page 5.

The terms "relatively non-heat-conductive facing" and "composition lining" refer to compositions of fiber reinforced materials including suitable binders and the like and suitable friction modifying materials, commonly known in the trade as brake lining.

From the foregoing, it will be apparent that the invention is not limited to the forms illustrated and described, but may well be embodied in other equivalent forms within the scope of the appended claims, as will readily appear to those skilled in the art. Reference will, therefore, be had to the appended claims for a definition of the limits of the invention.

What is claimed is:

1. Liquid cooled brake mechaeism including a stationary packing gland, a cylindrical brake drum rotatably mounted on the gland, said drum having an outer cylindrical wall having an outer surface adapted for frictional engagement by a brake shoe and axially spaced walls extending inwardly from said outer wall and forming, in conjunction with said gland, an annular chamber for cooling liquid, and means operable on rotation of the drum for supplying cooling liquid to said chamber and discharging cooling liquid therefrom including an inlet passage in said gland having one end terminating outside of said chamber and the other end terminating in the chamber in a region closely adjacent the axis of rotation of the drum, a stationary extension on the gland in said chamber extending radially outward therein and terminating closely adjacent the inner surface of said outer cylindrical wall, and an outlet passage in said gland and extension, said outlet passage having one end terminating outside of said chamber and the other end terminating in said chamber at the outer end of said extension.

2. Liquid cooled brake mechanism as set forth in claim 1, wherein the drum normally rotates in one direction, the outlet passage terminates in a scoop at the outer end of said extension, and the open end of the scoop faces in a direction opposite to the direction of movement of said outer drum wall when the drum is rotating in said one direction.

3. Liquid cooled brake mechanism as set forth in claim 1, wherein the outlet passage in said extension terminates at its outer end in substantially the uppermost region of said chamber.

4. Liquid cooled brake mechanism as set forth in claim 1, wherein said brake drum includes radially extending channels in said chamber terminating at their outer ends in a region closely adjacent the inner surface of said outer cylindrical wall and terminating at their inner ends adjacent the end of said gland inlet passage in said chamber.

5. Liquid cooled brake mechanism as set forth in claim 1, wherein said brake drum includes radially extending channels in said chamber terminating at their outer ends in a region closely adjacent the inner surface of said outer cylindrical wall and closely adjacent one end of said wall and terminating at their inner ends adjacent said other end of said gland inlet passage in said chamber, and said other end of said outlet passage in said extension terminates in a region closely adjacent the inner surface of said outer cylindrical wall and closely adjacent the other end of said wall.

6. Liquid cooled brake mechanism as set forth in claim 1, wherein said brake drum includes radially extending channels in said chamber terminating at their outer ends in a region closely adjacent the inner surface of said outer cylindrical wall and closely adjacent one end of said wall and terminating at their inner ends adjacent said other end of said gland inlet passage in said chamber, and said stationary extension has a plurality of passages extending radially outward therethrough, said passages terminating at their outer ends in a region closely adjacent the inner surface of said outer cylindrical wall and in a rgeion closely adjacent the other end of said wall, and being connected at their inner ends with said outlet passage in said gland.

7. Liquid cooled brake mechanism as set forth in claim 1, wherein said stationary extension is substantially cylindrical, and the radial surfaces thereof are relatively smooth surfaces corresponding to surfaces generated by two axially spaced radially extending lines rotating about the axis of rotation of said drum.

8. Liquid cooled brake mechanism including a stationary packing gland, a brake drum rotatably mounted thereon having an annular chamber for cooling liquid therein, one wall of said chamber having an outer surface adapted for engagement by a brake shoe, a heat exchanger for cooling liquid having inlet and outlet ports, an inlet passage in said packing gland connected at one end to the chamber in a region closely adjacent the axis of rotation of the drum and having a connection at the other end with the outlet port of said heat exchanger, and an outlet passage in said gland connected at one end to the chamber in substantially the radially outermost portion thereof and having a connection at the other end with the inlet port of said heat exchanger.

9. In a liquid cooled brake system for a vehicle of the type having an engine cooling circuit comprising a vehicle radiator, the vehicle engine, and connecting conduits, said circuit having spaced apart regions of relatively low and high pressures, a liquid cooled brake mechanism including a stationary packing gland, a cylindrical brake drum rotatably mounted on the packing gland and having an annular chamber for cooling liquid therein, one wall of said chamber having an outer friction surface formed thereon adapted to be engaged by a brake shoe, an inlet passage in said packing gland connected at one end to the chamber in a region adjacent the axis of rotation of the drum and connected to said cooling circuit in a region of relatively high pressure, and an outlet passage in said gland connected at one end to the chamber in substantially the radially outermost portion thereof and connected at the other end to said circuit in a region of relatively low pressure.

10. Liquid cooled brake mechanism including a stationary packing gland, a brake drum rotatably mounted thereon having a cylindrical portion and spaced apart walls, said gland, walls and cylindrical portion defining an annular chamber for cooling liquid in the drum, one end of said cylindrical portion being mounted on the gland for thermal expansion and contraction axially thereof, and means for circulating a cooling liquid in said chamber including an inlet passage in said gland terminating at one end outside of the chamber and at the other end in the chamber in a region closely adjacent the axis of rotation of the drum, and an outlet passage in the gland terminating at one end outside of the chamber and at the other end in the chamber in a region closely adjacent the inner surface of said cylindrical portion of the drum.

11. Liquid cooled brake mechanism including a stationary packing gland, a brake member rotatably mounted on the gland having an annular chamber for cooling liquid therein with one wall of said chamber having an outer surface portion adapted for frictional engagement by a brake shoe, a portion of said gland being exposed in said chamber and forming an inner wall for said chamber, and means for supplying a circulating cooling liquid to said chamber and for discharging cooling liquid therefrom including an inlet passage in said gland having one end terminating outside of said chamber and the other end terminating in a region closely adjacent the axis of rotation of the drum, a stationary extension on the gland in said chamber extending radially outward therein and terminating therein in a region of the chamber spaced radially outward from said other end of said inlet passage, and an outlet passage in said gland and extension, said outlet passage having one end terminating outside of said chamber and the other end terminating in said chamber adjacent the outer end of said extension.

12. Lquid cooled brake mechanism including a stationary member, a first brake drum carrying member mounted for rotation on the stationary member, a second brake drum carrying member mounted for rotation on the stationary member and spaced axially therealong from said first member, a cylindrical metal drum mounted on said members for rotation therewith concentric with the axis of rotation of said members, said stationary member, drum carrying members and drum forming an annular chamber for cooling liquid, the outer surface of the drum being a friction surface adapted for engagement by a brake shoe and the opposite inner surface being exposed in said chamber, a rotary seal between each drum carrying member and the stationary member for preventing leakage of liquid from the annular chamber between the stationary member and the drum carrying members, separate inlet and outlet passages extending through said stationary member from the outside thereof to the inside of said chamber and terminating in the chamber between said rotary seals, a heat exchanger having inlet and outlet ports, and conduits for cooling liquid connecting said inlet and outlet passages in said stationary member respectively with said outlet and inlet ports in said heat exchanger.

13. In a liquid cooled brake system, a stationary packing gland, a cylindrical drum rotatably mounted on the gland having an annular chamber for cooling liquid therein, one wall of said chamber having an outer friction surface formed thereon, a heat exchanger having inlet and outlet ports, an inlet passage in said packing gland connected at one end to the chamber in a region adjacent the axis of rotation of the drum and having a connection at the other end with the outlet port of said heat exchanger, an outlet passage in said gland connected at one end to the chamber in substantially the radially outermost region thereof and having a connection at the other end with the inlet port of said heat exchanger, said passages, chamber, connections, ports and heat exchanger forming a cooling liquid circuit for circulating cooling liquid in one direction from the outlet of the heat exchanger through the chamber and to the inlet of the heat exchanger, and a liquid pump connected in series in said circuit, said pump being so connected as to circulate cooling liquid through said circuit in said one direction.

References Cited in the file of this patent

UNITED STATES PATENTS

| | | |
|---|---|---|
| 1,131,810 | Zoller et al. | Mar. 16, 1915 |
| 1,832,686 | Bloss | Nov. 17, 1931 |
| 2,127,557 | Ells | Aug. 23, 1938 |
| 2,148,818 | Kattwinkel | Feb. 28, 1939 |
| 2,263,961 | Wilson | Nov. 25, 1941 |
| 2,517,973 | Cardwell et al. | Aug. 8, 1950 |
| 2,682,320 | Chamberlain et al. | June 29, 1954 |
| 2,821,271 | Sanford | Jan. 28, 1958 |
| 2,835,357 | Kelley et al. | May 20, 1958 |
| 2,852,118 | Lacroix et al. | Sept. 16, 1958 |